United States Patent

[11] 3,524,429

| [72] | Inventor | Gerard Edward Wilding<br>48 Wavendene Ave., Thorpe Lea, Egham, Surrey, England |
|---|---|---|
| [21] | Appl. No. | 715,890 |
| [22] | Filed | March 25, 1968 |
| [45] | Patented | Aug. 18, 1970 |

[54] IMPREGNATING MACHINES FOR ELECTRICAL WINDINGS
9 Claims, 10 Drawing Figs.

[52] U.S. Cl. ............................................... 118/620,
118/319, 118/320, 198/211
[51] Int. Cl. ................................................. B05c 5/00
[50] Field of Search ....................................... 118/230,
426, 319, 320, 620, 630, 9; 198/211

[56] References Cited
UNITED STATES PATENTS

| 1,747,517 | 2/1930 | Libbey | 118/319 |
|---|---|---|---|
| 2,578,427 | 12/1951 | Hussey et al. | 118/320X |
| 2,723,206 | 11/1955 | Falk | 118/319X |
| 3,145,127 | 8/1964 | Baun | 118/620UX |
| 3,355,310 | 11/1967 | Dejean et al. | 118/319X |

FOREIGN PATENTS

| 294,577 | 2/1954 | Switzerland | 118/410 |
|---|---|---|---|

*Primary Examiner*— John P. McIntosh
*Attorney*— Holcombe, Wetherill and Brisebois

ABSTRACT: Electrical components having windings to be impregnated with an insulating resin are rotatably carried near the periphery of a vertically mounted circular carrier. The components are carried on spindles driven by sprockets having a common drive chain. The carrier is itself rotationally indexed intermittently to bring the components in position below feed tubes from which resin is ejected onto the windings. At the impregnating point, the components are rotated at a higher speed by a separate chain which takes over from the common drive chain at that point. On approach to and following the point of impregnation the component windings which are for example small armature windings, are heated by the passage of an electrical current through them. Timing devices control the intermittent motion of the component carrier and pumps for the resin.

IMPREGNATING MACHINES FOR ELECTRICAL WINDINGS

BACKGROUND OF THE INVENTION

1. Field of the Invention

This invention relates to impregnating machines for electrical windings and is more particularly concerned with trickle impregnation of the windings of small electrical components such as, for example, the armatures or stators of fractional horsepower motors, relay coils, chokes and transformers.

2. Description of the Prior Art

It is known that traditional methods of impregnating electrical components by dipping, because of the necessity for prior masking and subsequent cleaning to remove excess resins often result in a costly operation. Moreover, the varying time required for each operation results in the interruption of a desired flow line production.

Due to its simplicity the "trickling" method of impregnation lends itself to automatic flow line production and in a known process the windings or components to be trickle impregnated are preheated to allow the trickled resin, after making contact with the component, to flow under a low viscosity condition, such flow being further aided by the capillary action of the windings and rotation of the components so that full coverage of all surfaces is achieved.

The preheat temperature is regulated according to the heat content of the component to be impregnated allowing the trickled resin to either partially or fully cure in situ. If required, subsequent heating may also be applied to effect further curing and thus ensure firm bonding of the surfaces.

The object of the invention is to provide a machine which is simple to operate, is conveniently accessible and is capable of efficiently impregnating components at an advantageously high production rate.

SUMMARY OF THE INVENTION

According to the present invention a machine for effecting trickle impregnation of the coil windings of electrical components comprises a component carrier which is mounted for intermittent motion in a vertical or near vertical plane and is supported in a rotary bearing relationship with a fixed circular surface which constitutes a supporting and bearing surface for the component carrier, the machine being provided with means for effecting rotation of the components at a given speed about their individual axes and means for applying an impregnating medium to the components as they travel past a predetermined point during pauses in the intermittent motion of the carrier.

Preferably the component carrier is in the form of an annulus and in an embodiment of the invention the annulus is connected in spaced relationship with another annulus by a plurality of spacing elements, the annuli being provided with spindles which engage the periphery of a fixed circular plate member. Means such as straddle brackets are provided to support the circular plate from a member fixed to the machine housing.

In a particular construction of machine according to the invention the motion of the component carrier is a step by step rotary motion and the application of the impregnating medium is effected while the components are temporarily stationary at the point referred to and are being rotated about their own axes at a speed which is higher than said given speed. Means are provided to effect heating of the components prior and subsequent to the point of application of the impregnating medium. Preferably the heating is effected by passing an electrical current through the windings of the components being impregnated.

In the particular construction of machine referred to the components are individually carried by spindles which are rotatably supported in the component carrier, the spindles being provided with individual driving means constituted by sprocket wheels, and a drive chain provides a common drive to all the sprocket wheels with the exception of one or more sprocket wheels at the point of application of the impregnating medium. The sprocket wheel or wheels at the point of application of the impregnating medium are driven by a chain separate from said common drive chain and a single electric motor serves to drive both chains, the separate chain being driven from the motor by speed step up means.

The step by step rotary motion of the component carrier is effected by intermittently operated indexing means which engage the individual component carrying spindles in succession, the indexing means comprising a spoked wheel which is intermittently rotatable by an air actuated piston in a cylinder to which air is supplied under control of a solenoid operated valve, the spokes of the wheel being arranged to engage the individual component carrying spindles.

BRIEF DESCRIPTION OF THE DRAWINGS

A machine embodying the invention will now be described in greater detail by way of example with reference to the accompanying drawings in which.

DESCRIPTION OF THE PREFERRED EMBODIMENT

Figure 1:
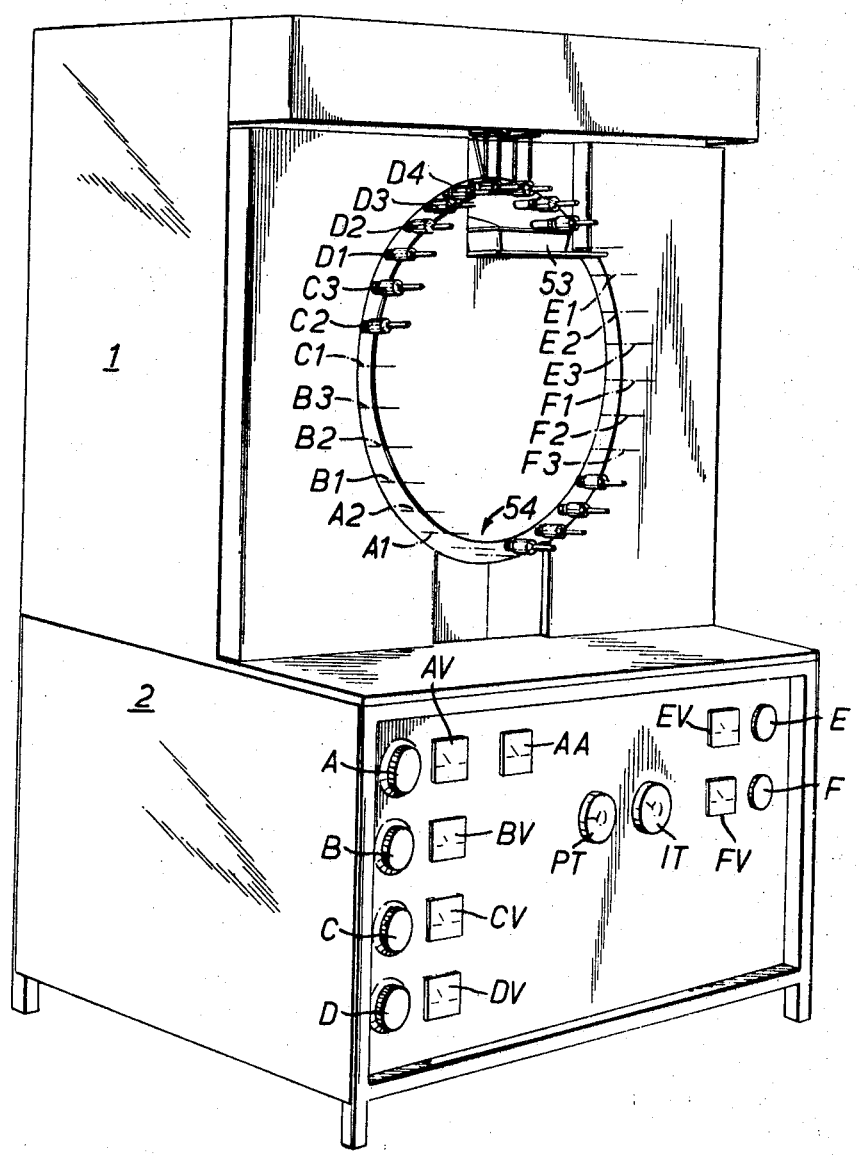
FIGURE 1 is a general perspective view of the machine.

Referring to the drawings, the components of the machine are housed in upper and lower casings 1 and 2 the front of the lower casing carrying control knobs and meters. Behind a fixed front cover plate 3 are further fixed plates 4, 4a and a fixed drum 5. The plates 3, 4 and 4a and the drum 5 are secured in spaced relation by bolt and spacer assemblies indicated generally at 6 in FIGURE 3. The periphery of the drum 5 provides a bearing surface for ten spindles 7 of which only one is shown in FIGURE 4, the spindles being journalled in two flat rings 8 and 9 connected together by spacers 10 (FIGURE 4) secured by screws 11. Three straddle brackets 12 spaced 120° apart serve to secure the drum 5 to an outer plate 13 which is fixed within the machine casing.

The rings 8 and 9 have journalled in them thirty hollow spindles 14 each having a sprocket wheel 15 keyed to it. The spindles 14 are disposed radially clear of the periphery of the drum 5 and the spindles 7 are located circumferentially around the rings 8 and 9 at points between the spindles 14.

Each of the spindles 14 has secured to it by a set screw 16 a chuck 17 the end 18 of which is formed with four longitudinal slots, not shown, which extend from its outer surface to its inner bore to provide flexibility and to facilitate insertion of the end 19 of the spindle of an armature 20 the winding of which is to be trickle impregnated. To ensure a firm grip by the chucks on the armature spindle a circlip, not shown, is preferably applied to the slotted end of the chuck.

Figure 2:
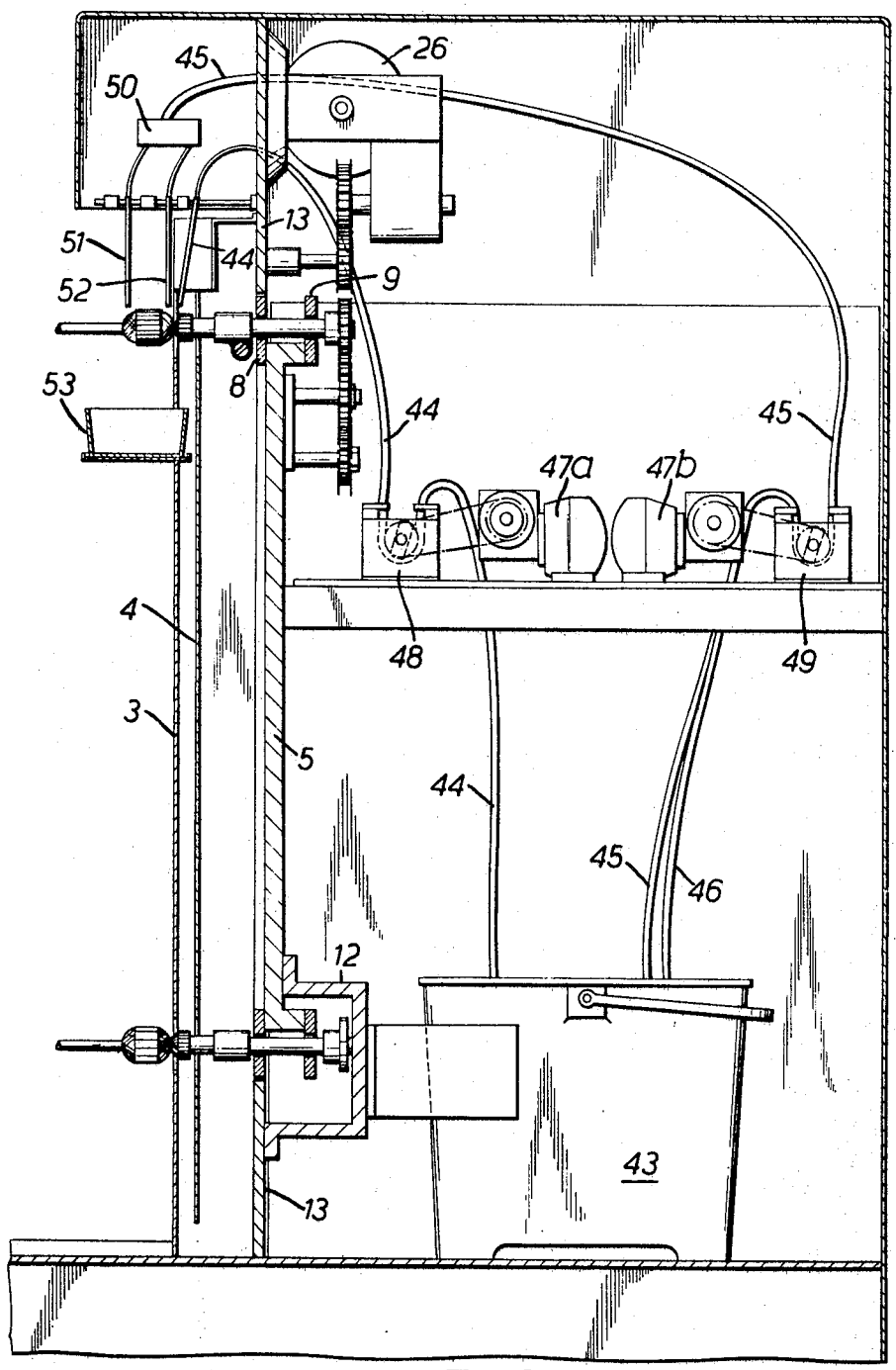
FIGURE 2 is a side elevation, partly in section.
Figure 3:
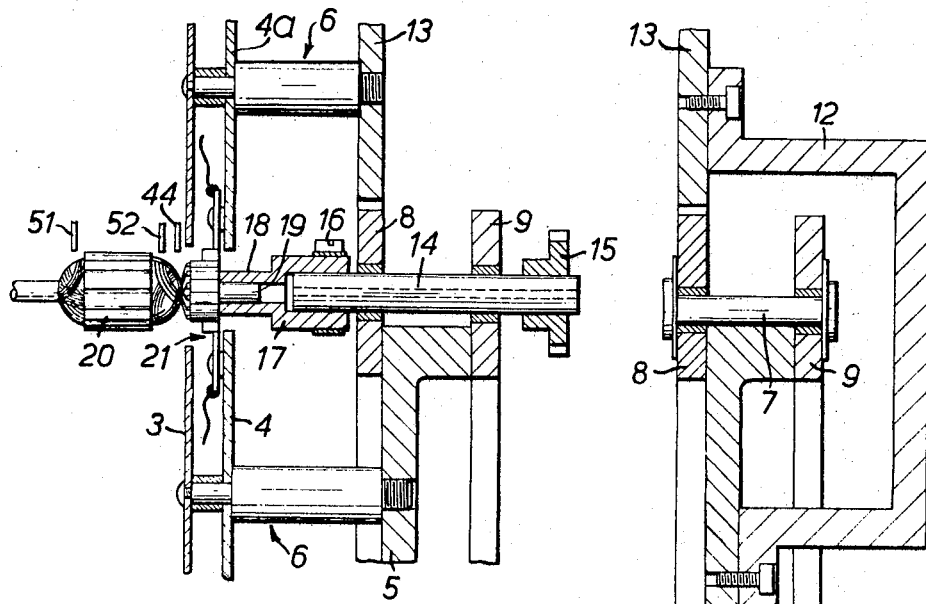
FIGURE 3 is a sectional view of a part of FIGURE 2 on a larger scale.
Figure 4:
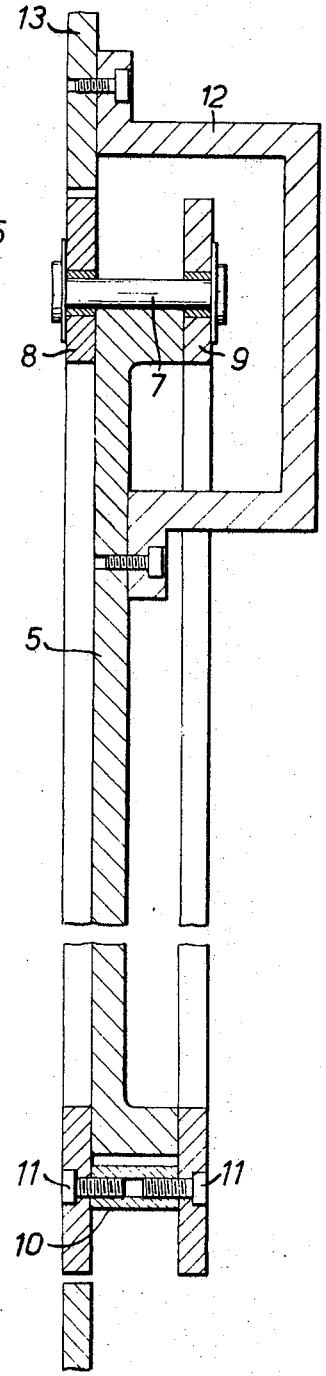
FIGURE 4 is a sectional view of details of the machine.
Figure 7:
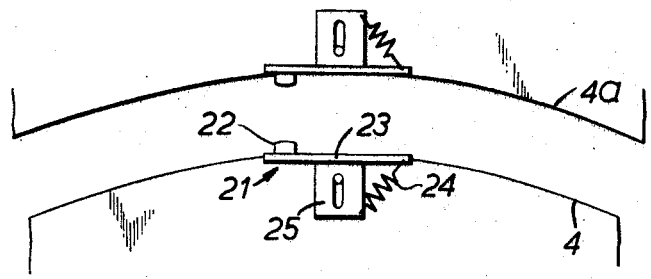
FIGURE 7 shows an electrical detail.

The plate 4 carries current supply brush assemblies 21 shown diagrammatically in FIGURE 3 but which are resiliently mounted as shown in FIGURE 7. Thus, the brush 22 is carried at one end of a lever pivoted at 23 and anchored at the other end by a spring 24 to a fixed support 25. Although only one pair of brush assemblies is shown in FIGURE 2, similar pairs are provided at each armature carrying spindle position at which it is desired to apply a heating current. The brush assemblies are connected to a source of supply of the order of fifty volts and enabling a current of the order of two and a half amps. to be passed through the windings as the armature passes between the brushes. The current is so applied in order to preheat the windings prior to reaching the trickle impregnating positions so as to facilitate flow of the resin into the windings and thereafter to effect curing of the resin.

Figure 5:
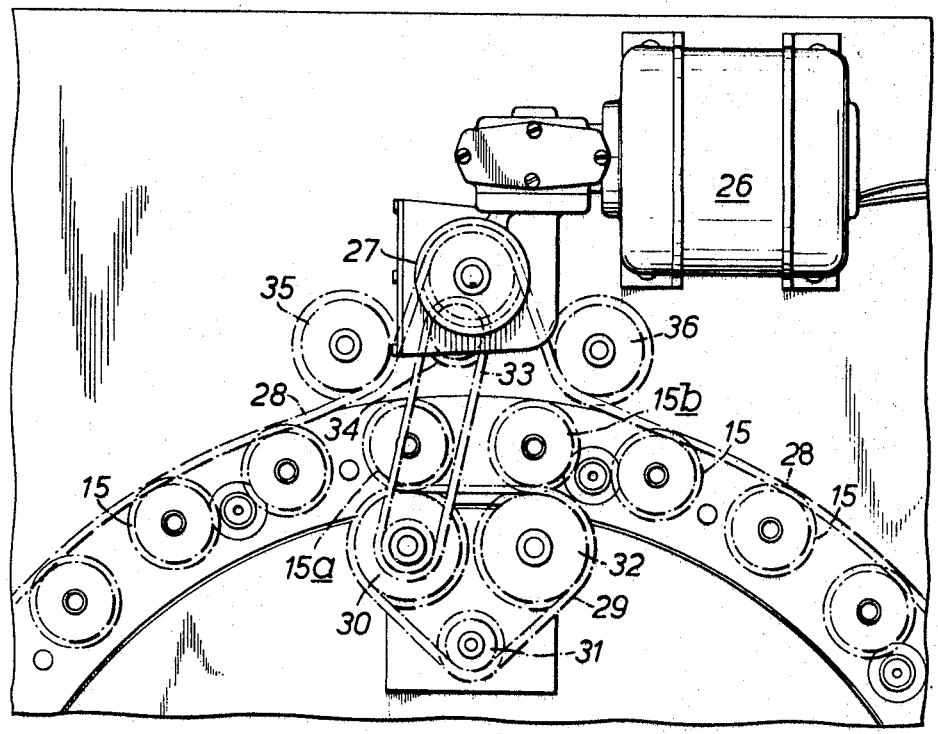
FIGURE 5 shows details of the driving arrangements.

Referring now to FIGURE 5, an electric motor 26 provides the drive for rotating the armatures 20 mounted on the spindles 14 via a sprocket wheel 27 over which an endless chain 28 passes and engages each of the sprockets 15 except the two sprockets in positions 15a and 15b. For a purpose to be described, when the sprockets reach these positions they are driven at a higher speed and are engaged by a separate chain 29 which passes over sprockets 30, 31 and 32. Sprocket 30 is driven by a chain 33 which passes over a sprocket 34 driven from the sprocket wheel 27. The idler sprocket wheels 35 and 36 are only for chain guiding.

Figure 6:
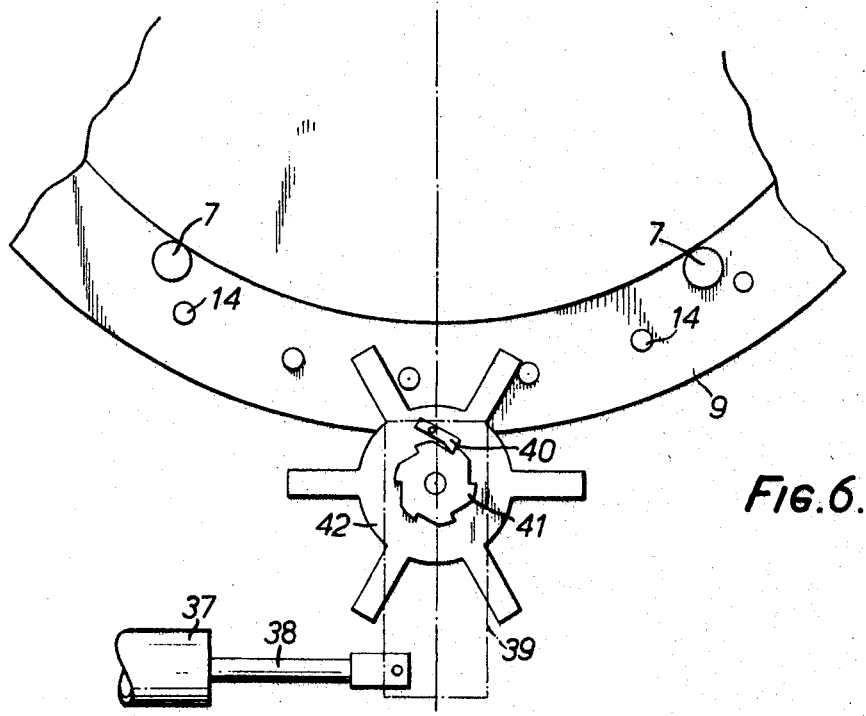
FIGURE 6 shows the indexing mechanism.

FIGURE 6 shows the means for indexing the rings 8 and 9. A pneumatic cylinder 37 has a piston rod 38 arranged to reciprocate to the right and left and attached to a plate 39. A spring loaded pawl 40 mounted on the plate co-operates with a ratchet wheel 41 having six recesses to correspond with six spokes on a star wheel 42. The ratchet wheel is keyed to the shaft of the star wheel which is disposed between the rings 8 and 9 so that the spokes engage the spindles 14 in turn. One end of the shaft of the star wheel is supported in a bearing, not shown, in the outer plate 13, the other end of the shaft being supported in a bearing in a straddle bracket, not shown, but which is mounted in a similar manner to bracket 12.

The windings impregnating material is preferably a polyester resin which is pumped to the trickle positions 15a and 15b from a supply tank 43 (FIGURE 2) via flexible tubes 44, 45 and 46. Two electric motors 47a, 47b drive two peristaltic pumps 48 and 49, the tube 44 being operated on by the pump 48 and both the tubes 45 and 46 being operated on by the pump 49. The tube 44 terminates adjacent the end of the armature winding nearest the commutator and is directed so that the resin falls on the winding leads which pass over an insulating washer to connection points on the commutator bars. The purpose of this arrangement is to resin-bond the leads in position and because the required rate of resin feed to the tube 44 is less than that required for tubes 45 and 46, a separate pump driving motor is used.

The tubes 45 and 46 respectively lead to the two armatures at the trickle positions 15a and 15b, only the tube 45 being shown leading to the pump 49 and terminating in a small header 50. Tubes 51 and 52 fed by the header terminate respectively at opposite ends of the armature as shown in FIGURES 2 and 3 and are arranged so that the resin issuing from them drips on to the windings. A dish 53 (FIGURES 1 and 2) mounted below the trickle position serves to collect surplus resin which may drop from the armatures.

Figure 8:
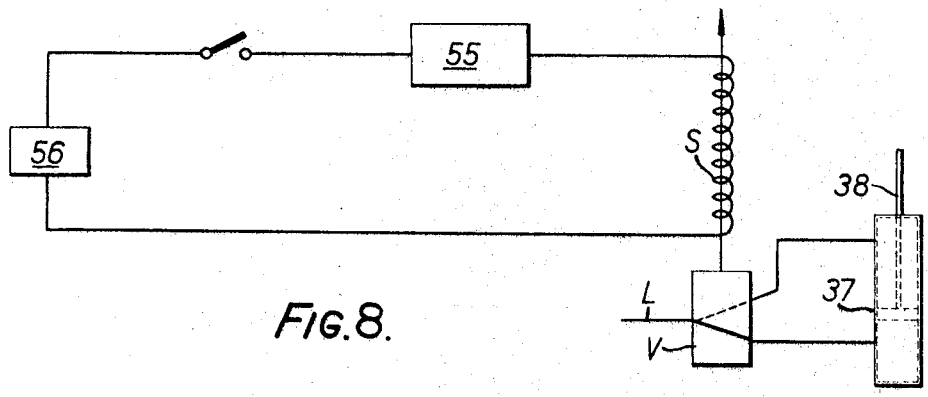
FIGURES 8, 9 and 10 are diagrammatic representations of certain control features.
Figure 9:
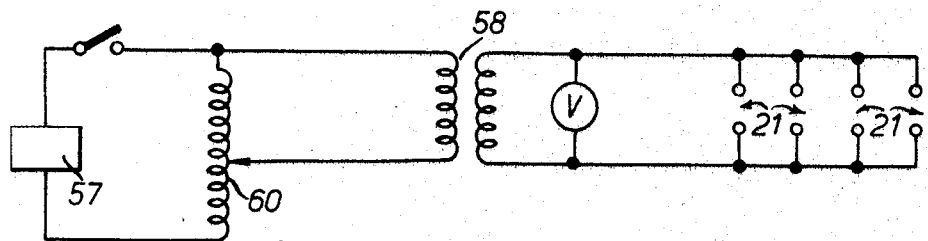

In use and operation of the machine described, the armatures are fed by a conveyor to the machine at an average rate of 250 per hour. Each armature is manually or automatically fed into the load position indicated at 54 in FIGURE 1 and an indexing time of 15 seconds is preset by a timer 55 (FIGURE 8) which determines the instants at which current is fed from a source of supply 56 to a solenoid coil S. The solenoid actuates a valve V to direct air from a supply line L to one side or the other of a piston in the pneumatic cylinder 37 in FIGURE 6. The rings 8 and 9 are indexed clockwise and when the first loaded armature reaches the position indicated at A1 in FIGURE 1 a preheating current is passed through its windings from a heating circuit of the form shown in FIGURE 9. This circuit includes connection to a source of supply 57, a step down transformer 58 and a voltmeter V. Adjustment of the input to transformer 58 is effected by an adjustable tapping on a coil 60 connected across the source of supply. Similar preheating of the armature windings is effected as the armatures pass successively between the brush assemblies to which they are progressively indexed until the first trickle position 15a is reached.

Voltage regulator control knobs A, B, C and D on the front of the machine casing as shown in FIGURE 1 serve to adjust, as required, the supply to the heating positions identified by groups A1, A2, B1 to B3, C1 to C3 and D1 to D4.

Figure 10:
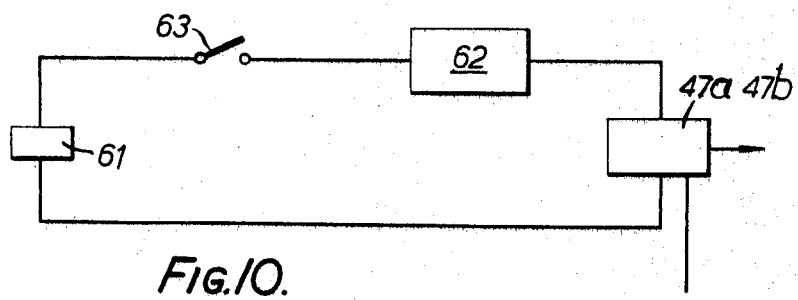

The trickle supply of resin is controlled by the trickle circuit shown in FIGURE 10 which is energised by a source of supply 61 and includes a timer 62 and the pump motor 47. When the trickle switch 63 is closed the motors 47a, 47b are energised immediately after an indexing step has been carried out and a predetermined quantity of resin is ejected from the tubes 44, 45 and 46. When an armature reaches the trickle position 15b a further quantity of resin is in similar manner ejected from the tubes 51 and 52.

While at positions 15a and 15b the armatures are rotated at a higher speed as described with reference to FIGURE 5, the purpose being to ensure rapid distribution of the resin as it falls on to the windings. As the impregnated armatures progress from position 15b they are supplied with a further heating current to effect curing of the resin at each of the positions E1 to E3 and F1 to F3. Throughout the remaining progressive positions the armatures are allowed to cool off and they are unloaded from the machine manually or automatically as they individually reach the lowest position.

Voltage regulator control knobs E and F (FIGURE 1) adjust the curing current as required the adjusted voltage being indicated by voltmeters EV and FV. Similarly, voltmeters AV, BV, CV and DV are provided adjacent their respective control knobs. An ammeter AA provides an indication of the current supplied at the first heating position A1. The knob IT controls the indexing timer 55 in FIGURE 8 and the knob PT controls the pump timer 62 in FIGURE 10.

In or order to achieve coverage of the windings, the whole machine is tilted forwards at an angle of the order of 2°, this being achieved conveniently simply by making the rear legs of the machine adjustable in height in any well known manner.

Although particular constructional details of the machine have been described, it will be understood that alternative forms of mechanism may be adopted in carrying out the invention. For example, the component carrier may be constituted by an outer annulus and an inner annulus formed with a radially inwardly extending flange which engages the front face of a fixed member corresponding to the drum 5. The two annuli are spaced apart by sets of bearings, for example ball bearings, the races of which are inserted in recesses in the front and rear faces of the annuli and provide bearings for the spindles 14. At the front faces of the annuli washers retained by circlips on each spindle provide seals for the bearings. At the rear faces of the annuli there is provided on each spindle a toothed wheel held on the spindle by a circlip. The wheel is of large enough diameter to extend over the rear face of the drum 5 and, in conjunction with the flange on the inner annulus previously referred to, to afford stability of support for the component carrier on the drum 5. The teeth on the wheel co-operate with a rack so as to provide an indexing means alternative to that hereinbefore described.

A plain annulus may be used instead of a toothed wheel and in this case the previously described indexing means may be used, the star wheel 42 being positioned so that its spokes engage rearwardly extending ends of the spindles.

The fixed member corresponding to the drum 5 has a series of, for example ten, rollers accommodated in radial recesses in the periphery of the drum, the individual rollers being supported on spindles journalled in the drum. The diameters of the rollers are such that they project slightly from the periphery of the drum so that the outer periphery of the inner annulus forming part of the component carrier rides on the rollers.

The method of driving the component carrying spindles is as previously described, namely by the provision of the chain driven sprockets 15 mounted at the ends of the spindles.

Any convenient form of pump may be used to feed the impregnating medium to the components and while reference has been made to peristaltic pumps they may be replaced by pumps of the orbital lobe type. Again, the chain and sprocket drive arrangements may be replaced by belts and pulley wheels and clearly any appropriate form of indexing device can replace that described.

The machine described offers a number of advantages compared with known forms of machine for effecting trickle impregnation of the windings of small electrical components and while reference has been made specifically to armature windings, it will be seen that the machine, with minor modifications in holding devices for the components, may be used to carry out high speed impregnation of a wide variety of components.

The volume of resin to be dispensed will be determined by the size of the components to be impregnated and the pump motor speed will be set accordingly. The output speed of the machine will also be dependent on the size of the components to be impregnated and will be regulated by adjusting the indexing time.

The machine lends itself to either batch processes or to a flow line production layout and due to the compactness of the vertically mounted rotary mechanism, the machine requires little floor space and is economical to maintain. The product finish of components impregnated by the machine described is superior to that of know methods and little or no subsequent cleaning operations are involved.

I claim:

1. A machine for effecting trickle impregnation of the coil windings of electrical components comprising an annular component carrier which is mounted for intermittent motion in a vertical plane and is supported in a rotary bearing relationship from the periphery of a fixed circular plate member, the machine being provided with means for effecting rotation of the components at a given speed about their individual axes, the machine further comprising means for applying an impregnating medium to the components as they travel past a predetermined point during pauses in the intermittent motion of the carrier.

2. A machine according to Claim 1 in which the annular component carrier is connected in spaced relationship with another annulus by a plurality of spacing members, the annuli being provided with spindles which engage the periphery of the circular plate member.

3. A machine according to Claim 2 in which means provided to support the circular plate member comprise a member attached to the plate member and extending beyond the outer diameter of the annular component carrier to a fixed part of the machine.

4. A machine according to Claim 1 in which the motion of the component carrier is a step by step rotary motion and the application of the impregnating medium is effected while the components are temporarily stationary at the point referred to and are being rotated about their own axes at a speed which is higher than said given speed, the components being individually carried by spindles which are rotatably supported in the component carrier, the spindles provided with individual driving means constituted by sprocket wheels and in which a drive chain provides a common drive to all the sprocket wheels with the exception of one or more sprocket wheels at the point of application of the impregnating medium.

5. A machine according to Claim 4 in which one or more sprocket wheels at the point of application of the impregnating medium are driven by a chain separate from said common drive chain, a single electric motor serving to drive both chains, said separate chain being driven from said motor by speed step up means.

6. A machine according to Claim 4 in which the step by step rotary motion of the component carrier is effected by intermittently operated indexing means which engage the individual component carrying spindles in succession and in which the indexing means comprise a spoked wheel intermittently rotatable by an air actuated piston in a cylinder to which air is supplied under control of a solenoid operated valve, the spokes of the wheel being arranged to engage the individual component carrying spindles, the energising current for the solenoid being controlled by a circuit including a timing device.

7. A machine according to Claim 1 and provided with means for effecting heating of the components prior and subsequent to the point of application of the impregnating medium, and in which the heating is effected by passing an electrical current through the windings of the components to be impregnated, current supply brush assemblies being carried by fixed members supported by the fixed circular plate member, and the fixed members having an annular gap between them to permit passage of the components and their supporting means.

8. A machine according to Claim 7 in which at each component heating position the brush assemblies are mounted so that the brushes project into the annular gap and are engaged by current pick up means connected with the windings to be impregnated.

9. A machine according to Claim 1 and including peristaltic pumping means which serve to distribute an impregnating medium from a source of supply via flexible tubes to the points of impregnation, one peristaltic pump serving to supply the impregnating medium to selected portions of the winding to be impregnated and a second peristaltic pump serving to supply the impregnating medium to different selected portions of the windings.